(12) United States Patent
Chamberlain et al.

(10) Patent No.: US 10,894,391 B2
(45) Date of Patent: Jan. 19, 2021

(54) LAMINATED GLAZING (71) Applicant: PILKINGTON GROUP LIMITED, Lancashire (GB)

(72) Inventors: Mark Andrew Chamberlain, Lancashire (GB); Leigh Francis Mellor, Merseyside (GB); Hartwig Schneider, Witten (DE)

(73) Assignee: PILKINGTON GROUP LIMITED, Lancashire (GB)

( * ) Notice: Subject to any disclaimer, the term of this patent is extended or adjusted under 35 U.S.C. 154(b) by 248 days.

(21) Appl. No.: 15/579,032

(22) PCT Filed: May 23, 2016

(86) PCT No.: PCT/GB2016/051478
§ 371 (c)(1),
(2) Date: Dec. 1, 2017

(87) PCT Pub. No.: WO2016/193669
PCT Pub. Date: Dec. 8, 2016

(65) Prior Publication Data
US 2018/0162104 A1    Jun. 14, 2018

(30) Foreign Application Priority Data

Jun. 3, 2015  (GB) .................................. 1509630.8

(51) Int. Cl.
*B60L 1/02*    (2006.01)
*B32B 17/10*    (2006.01)
*H05B 3/84*    (2006.01)
*H05B 3/06*    (2006.01)

(52) U.S. Cl.
CPC .... *B32B 17/10036* (2013.01); *B32B 17/1022* (2013.01); *B32B 17/10174* (2013.01);
(Continued)

(58) Field of Classification Search
CPC .............. B32B 17/10; B32B 17/10036; B32B 17/10174; B32B 17/10192;
(Continued)

(56) References Cited

U.S. PATENT DOCUMENTS 3,612,745 A    10/1971   Warren
4,361,751 A    11/1982   Criss et al.
(Continued)

FOREIGN PATENT DOCUMENTS

DE    36 44 297 A1    7/1987
EP     1 331 089 A1    7/2003
(Continued)

OTHER PUBLICATIONS

International Search Report (PCT/ISA/210) dated Aug. 11, 2016, by the European Patent Office as the International Searching Authority for International Application No. PCT/GB2016/051478.
(Continued)

Primary Examiner — Hung D Nguyen
(74) Attorney, Agent, or Firm — Buchanan Ingersoll & Rooney PC (57) ABSTRACT

A laminated glazing comprising, a first ply of a glazing material, a second ply of a glazing material, a film having an electrically conductive coating, the film being located between the first ply and the second ply, and a first busbar in electrical contact with the electrically conductive coating, the first busbar comprising an expansion portion, the expansion portion comprising a bridging busbar portion or a gap in the first busbar. Methods for producing the laminated glazing are also described.

15 Claims, 8 Drawing Sheets

(52) U.S. Cl.
CPC ......... *B32B 17/10761* (2013.01); *H05B 3/84* (2013.01); *H05B 2203/011* (2013.01)

(58) Field of Classification Search
CPC .......... B32B 17/1022; B32B 17/10229; B32B 17/10293; B32B 17/10761; B32B 17/10348; B32B 17/10385; B32B 17/1077; B32B 2367/00; H05B 3/16; H05B 3/84; H05B 3/86; H05B 3/265; H05B 3/267; H05B 2203/002; H05B 2203/007; H05B 2203/008; H05B 2203/009; H05B 2203/011; H05B 2203/013; H05B 2203/016; H05B 2203/017; H05B 2203/031
USPC ........ 219/201, 203, 522, 541, 202; 428/209, 428/210, 332, 339
See application file for complete search history.

(56) References Cited

U.S. PATENT DOCUMENTS

| | | | |
|---|---|---|---|
| 6,042,932 | A | 3/2000 | Ingles et al. |
| 6,242,088 | B1 | 6/2001 | Costa |
| 6,261,398 | B1 | 7/2001 | Costa |
| 6,559,419 | B1 | 5/2003 | Sol et al. |
| 2003/0111160 | A1 | 6/2003 | Bolognese et al. |
| 2003/0150848 | A1 | 8/2003 | Noguchi et al. |
| 2008/0318011 | A1 | 12/2008 | Chaussade et al. |
| 2011/0097572 | A1 | 4/2011 | Yonekura et al. |
| 2012/0103961 | A1* | 5/2012 | Offermann ........ B32B 17/10192 219/203 |

FOREIGN PATENT DOCUMENTS

| | | |
|---|---|---|
| WO | WO 01/51279 A2 | 7/2001 |
| WO | WO 03/015473 A2 | 2/2003 |

OTHER PUBLICATIONS

Written Opinion (PCT/ISA/237) dated Aug. 11, 2016, by the European Patent Office as the International Searching Authority for International Application No. PCT/GB2016/051478.

\* cited by examiner

LAMINATED GLAZING

The present invention relates to laminated glazing and to methods for manufacturing laminated glazings.

Laminated glazings comprising two or more sheets of glazing material, especially glass, bonded together using bonding polymers and having an interlayer functional film are known. Such functional films may be used to provide beneficial properties to the glazing such as solar control properties, heatability or increased safety. To provide a laminated glazing having heat insulation, solar protection properties or electrical conductivity, the functional film may be provided with a thin coating comprising a silver layer embedded between two dielectric layers. A problem that may arise when providing a functional film in a laminated glazing is distortion or wrinkling of the functional film as a result of the application of vacuum, pressure and heating during the lamination process since lamination usually involves heating the plies of the laminate in an autoclave to a temperature at which the bonding polymer softens and can flow to form a transparent clear film. This problem may be particularly difficult for curved laminated glazings (such as automotive windshields) where the tendency to form a laminate having a wrinkled appearance may be greater.

WO-A-2001/051279 discloses laminated glass panes which incorporate a transparent functional film embedded between the laminating layers and methods for the manufacture of such panes and solves the problem of wrinkle formation by arranging the film so that it is not co-extensive with the glazing material plies.

U.S. Pat. No. 4,361,751 discloses electrical busbars and more particularly flexible busbars designed to flex at the edge of the window for connection to the power supply.

U.S. Pat. No. 6,242,088 discloses a bi-axially stretched carrier film co-extensive with plies of glazing materials and having a heat shrinkage coefficient in a particular range.

When functional films are required to be electrically conductive e.g. to provide heating for a glazing, a particular problem is that busbars which are in electrical contact with an electrically conductive coating on the film and serve to connect the electrically conductive coating to the power supply, may also give rise to wrinkling effects, especially after lamination. A further potential problem is that wrinkles in the coated film may cause damage in the form of cracks in the electrically conductive coating which (depending on the direction and position of the wrinkles) may result in hot and/or cold spots forming during electrical powering of the circuit. Such damage may cause premature failure of the part.

It is an aim of the present invention to address such problems.

The present invention according provides, in a first aspect, a laminated glazing comprising, a first ply of a glazing material, a second ply of a glazing material, a film having an electrically conductive coating, the film being located between the first ply and the second ply, and a first busbar in electrical contact with the electrically conductive coating, characterised in that the first busbar comprises an expansion portion, the expansion portion comprising a bridging busbar portion or a gap in the first busbar.

Laminated glazings according to the invention are advantageous because wrinkling, especially in the general area of the busbar is prevented or much reduced, which reduces the chances of hot or cold spots and, therefore, the premature failure of such a laminated glazing. The use of an expansion portion appears to reduce the effect of the relative movement of the busbar, film and other components of the laminated glazing (many or all of which have different thermal expansion characteristics) during the autoclave process, thus reducing wrinkling.

Usually, the laminated glazing will further comprise a second busbar in electrical contact with the electrically conductive coating.

The first, and optionally, the second, busbar preferably comprise metal foil. The metal foil is preferably copper foil, more preferably tinned copper foil.

The film material may comprise a thermoplastic polymer, for example a polyester, a polyacrylate, or a polycarbonate. The film material is preferably a polyester. The most preferred film material is polyethylene terephthalate (PET); thus, the film preferably comprises PET. This is advantageous because PET films may be conveniently coated, especially by sputtering.

The electrically conductive coating preferably has a good electrical conductivity. Thus, usually the coating will comprise one or more layers of a metal, preferably silver, sandwiched between metal oxide (or other dielectric) layers. There may be one, two, three or more metal layers, for example, one silver layer, two silver layers, or three silver layers in the electrically conductive coating. The metal oxide layers may comprise, for example, indium oxide, tin oxide, zinc oxide, aluminium oxide or a mixed metal oxide of, for example, zinc/tin oxide.

In order to ensure good adhesion between the plies of the laminated glazing, the laminated glazing preferably further comprises at least one polymer ply, and preferably at least two polymer plies, located between the first ply and the second ply, the at least one polymer ply, and preferably at least two polymer plies, being in contact with the film. Preferably, the laminated glazing comprises a first polymer ply and a second polymer ply each located between the first ply of a glazing material and the second ply of a glazing material, the first polymer ply and the second polymer ply being in contact with each respective surface of the film (i.e. sandwiching the film between them).

Preferably, the, or each, polymer ply comprises polyvinyl butyral (PVB) which is advantageous because it exhibits good adhesion after lamination to both glazing materials (especially glass) and film (especially PET). When there are two polymer plies, preferably the polymer plies are placed on either side of the film to ensure good adhesion to both glazing material (especially glass) plies, thereby holding the laminated glazing together after lamination.

It is preferred that the first busbar comprises tab portions on each side of the expansion portion. Tab portions are usually wider portions of the busbar, which tend to reduce still further wrinkling effects around the expansion portion.

In one version, the expansion portion may comprise an expansion joint. In this case, the expansion joint preferably comprises at least one bridging busbar portion. The bridging busbar portion may be a piece of busbar material (e.g. metal, preferably copper foil and more preferably tinned copper foil) adhered to either part of the first busbar across a gap in the busbar in the expansion portion. Adhesion of the bridging busbar portion may be by solder or an adhesive as long as there is electrical contact between the bridging busbar portion and each part of the first busbar across the gap.

Alternatively, the bridging busbar portion may be formed of the same material and may be substantially continuous with the rest of the first busbar. Thus, the first busbar and the bridging busbar portion may be formed of a strip of conductive material, preferably a single strip of conductive material and more preferably the same strip of conductive material.

Preferably, the bridging busbar portion is not in direct contact with the film or with the electrically conductive coating of the film to further reduce the wrinkling effect.

Preferably, the bridging busbar portion will have less mechanical strength than the first busbar so that the bridging busbar portion is more likely than the first busbar to distort during e.g. the lamination process. This may be achieved by, for example, the bridging busbar portion having a narrower width than the first busbar and/or having a lower thickness than the first busbar. For example, a busbar size may be 10 mm wide×100 µm thick, whereas the bridging busbar portion may be two pieces of size 4 mm wide (total 8 mm wide)×100 µm thick. It is preferable that the bridging busbar portion is not too thin nor too narrow to ensure that it has sufficient electrical conductivity to reduce the chance of a hotspot occurring.

Usually, the bridging busbar portion will comprise at least one bend and more usually at least two bends. The bend or bends of the bridging busbar portion may be of relatively wide curvature (so that at least a portion the bridging busbar portion may be generally S-shaped or sinusoidal) or the bend or bends of the bridging busbar portion may be of relatively narrow curvature so that at least a portion of the bridging busbar portion is angular.

The expansion portion may comprise a gap in the first busbar. Thus, the first busbar may be a split busbar comprising two parts with the split/gap occurring at the expansion portion. The gap may usually be narrow for example, in the range 5 mm to 20 mm, preferably 7 mm to 15 mm, more preferably 9 mm to 13 mm.

Preferably, the first busbar comprises tab portions on each side of the gap. In addition to the advantages of tab portions discussed above, a further advantage is that the tab portions may comprise electrical connectors, enabling a twin cable to connect to, and thus supply voltage and current, to the adjacent electrical connection ports.

Whether the expansion portion is an expansion joint or a gap, it is preferred that the film comprises a cut-out portion, more preferably a cut-out portion that is located at the expansion portion, and is preferably substantially co-extensive with the expansion portion.

Thus, the present invention provides, in a second aspect, a laminated glazing comprising, a first ply of a glazing material, a second ply of a glazing material, a film having an electrically conductive coating, the film being located between the first ply and the second ply, and a first busbar in electrical contact with the electrically conductive coating, wherein the film comprises a cut-out portion.

Preferably the cut-out portion has rounded sides to reduce the chance of wrinkles being caused by corners around the cut-out.

The great benefit of the cut-out, especially when in combination with the expansion portion is that if there are, unusually, any distortions in the busbar at or around the expansion portion this does not significantly affect the film because the distortion would be in the region of the cut-out. For example, in an expansion joint, small deformations may be observed in the bridging busbar portion (the bridging busbar portion may be soldered to two tabs on each busbar part) but this would not cause wrinkles in the film because it would occur in the area of the cut-out. As discussed above, the effect of a bridging busbar portion in the case where it is of lower mechanical strength than the first busbar is to provide a weaker portion so that any relative movement or creases in the first busbar tends to occur in this portion.

The first busbar (and/or second busbar if present) may be formed by generally any suitable method, for example, laser cutting. However, the first busbar (and/or second busbar if present) is preferably pre-formed by stamping. Even more preferably the busbar(s) is/are formed by stamping out metal foil provided with an adhesive layer. Usually, the first (and second) busbar has a thickness in the range 50 µm to 150 µm, and usually has a width in the range 3 mm to 15 mm.

In many laminated glazings, the glazing may further comprise an obscuration band on the first ply and/or on the second ply of glazing material. This is advantageous because it may be adapted to obscure the busbar and expansion portion, and the optional cut-out, when the laminated glazing is installed and in use.

The laminated glazing may be made by a lamination process using high pressure and elevated temperature, e.g. in an autoclave.

In a third aspect, the present invention accordingly provides, a method for manufacturing a laminated glazing, the method comprising
a) providing a first ply of a glazing material,
b) providing a second ply of a glazing material,
c) providing a film having an electrically conductive coating, the film being located between the first ply and the second ply,
d) providing a first busbar in electrical contact with the electrically conductive coating, and
e) laminating the glazing,
characterised in that the first busbar comprises an expansion portion, the expansion portion comprising a bridging busbar portion or a gap in the first busbar.

The method preferably further comprises providing at least one polymer ply (and more preferably at least two polymer plies) located between the first ply of a glazing material and the second ply of a glazing material, the at least one polymer ply being in contact with the film. Thus, preferably the method further comprises: b1) providing a first polymer ply and a second polymer ply each located between the first ply of a glazing material and the second ply of a glazing material, the first polymer ply and the second polymer ply being in contact with each respective surface of the film.

The present invention will now be described by way of example only, and with reference to, the accompanying drawings, in which.

In the Figures, the same reference numbers refer to the same or to corresponding features.

Figure 1:
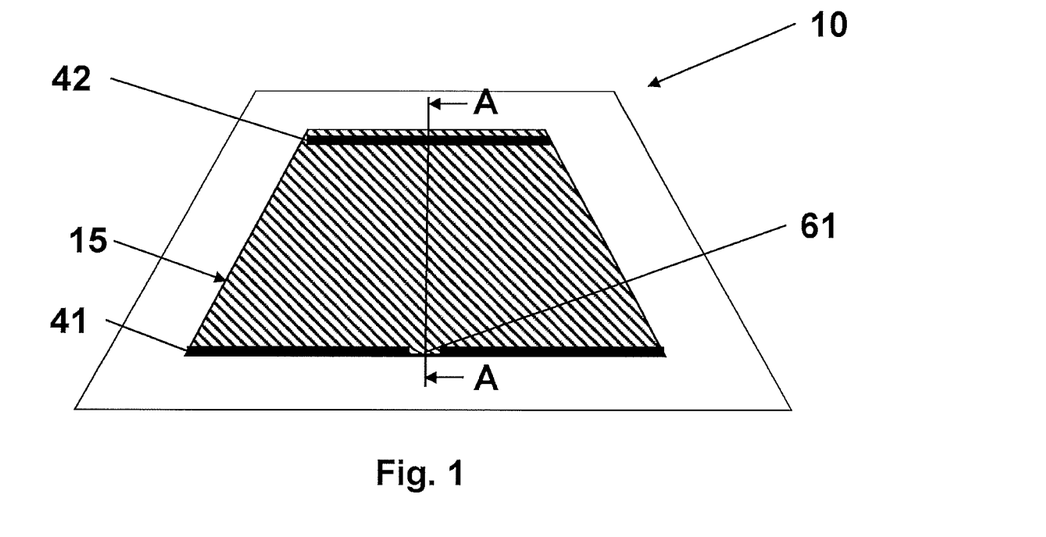
FIG. 1 is a schematic plan view of a first laminated glazing according to the invention.

FIG. 1 shows a laminated glazing 10 according to an embodiment of the invention. The laminated glazing 10 as shown is an automotive glazing in the form of a windscreen. Other types of laminated glazing may, of course, be constructed and fall within the scope of the present invention. Other types of laminated glazing include, but are not limited to, automotive side windows, rear windows and/or roof windows or architectural laminated glazings.

The laminated glazing 10 comprises an electrically conductive portion 15, to which electrical connection is made by a lower (referring to the orientation in the Figures and as the laminated glazing would be orientated in use), first busbar 41 and an upper, second busbar 42. First busbar 41 comprises an expansion portion 61 in the form of a gap in first busbar 41, so that first busbar 41 is a split busbar 41.

Figure 2:
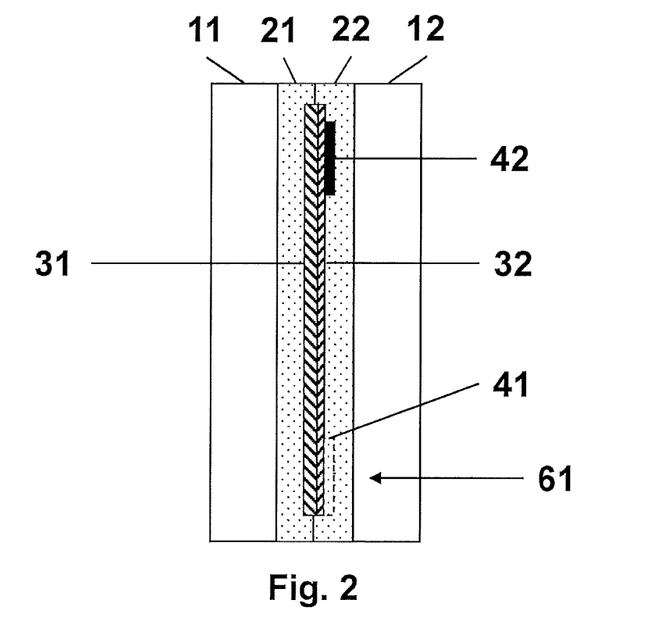
FIG. 2 is a schematic cross section on line A-A of FIG. 1.

The construction of the laminated glazing 10 is more clearly seen in FIG. 2, which is a cross-sectional view on A-A of FIG. 1 through the expansion portion 61. The laminated glazing 10 comprises a first ply of glazing material 11 and a second ply of glazing material 12. The plies of glazing material 11, 12 may be annealed glass or toughened glass. The glass composition may be soda-lime glass, usually made by the float glass production process. A film 31 is located between the first 11 and second 12 plies of glazing material. The film 31 may be of a suitable polymer, preferably polyethylene terephthalate (PET), of a thickness generally in the range 30 µm to 70 µm, usually about 50 µm. The film 31 has an electrically conductive coating 32 on at least one surface. The electrically conductive coating 32 generally comprises one, two or three silver layers, with one or more dielectric layers of indium oxide between each silver layer. In order to provide a laminated glazing with good adhesion, the film 31 is sandwiched between a first polymer ply 21 and a second polymer ply 22. The polymer plies 21, 22 are preferably of polyvinyl butyral (PVB) or other polymer which provides good adhesion to both the glazing plies 11, 12 (especially to glass plies) and to the film 31 (especially to PET). The PVB polymer ply 22 may be an acoustic PVB or a wedged acoustic PVB.

The first busbar 41 and the second busbar 42 are both arranged so as to be in electrical contact with the electrically conductive coating 32. The busbars 41, 42 are usually designed so as to have a low electrical resistance in order that a voltage applied from an external circuit is substantially the same along the length of either busbar 41, 42. The busbars 41, 42 may be made of a metal foil, preferably copper foil which may be tinned. Copper foil is particularly advantageous because of copper's low electrical resistivity. The busbars 41, 42 will usually have a thickness in the range 50 µm to 150 µm, with a preferred thickness of about 100 µm. The busbars 41, 42 will usually have a width in the range 3 mm to 15 mm, preferably about 10 mm. A split busbar 41 as shown in FIGS. 1 and 2 is greatly advantageous because it, surprisingly, reduces wrinkles in the film 31 which previously have been a problem after glazings have been laminated.

Figure 3:
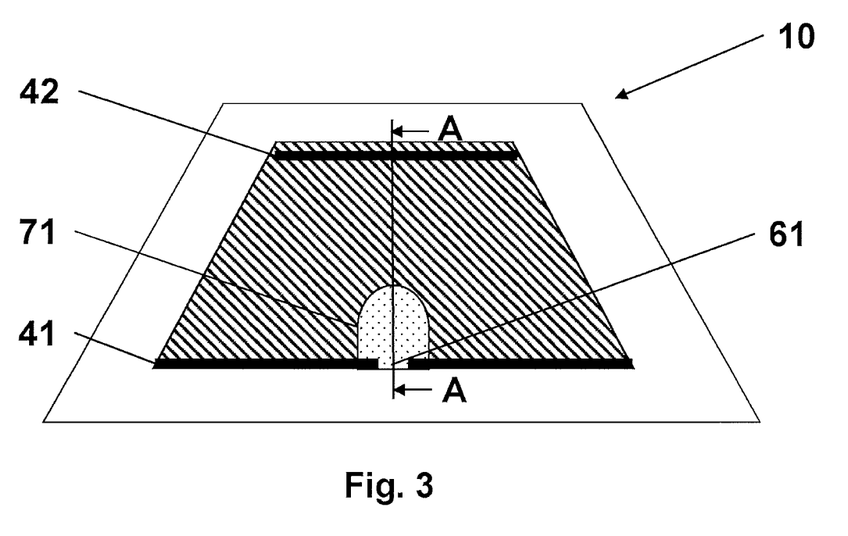
FIG. 3 is a schematic plan view of a second laminated glazing according to the invention.
Figure 4:
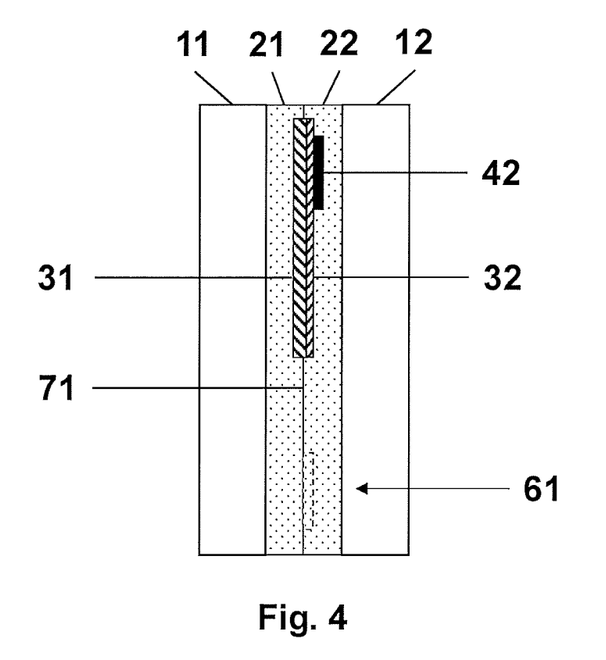
FIG. 4 is a schematic cross section on line A-A of FIG. 3.

FIG. 3 and FIG. 4 (which is a cross-sectional view on A-A of FIG. 3, through the expansion portion 61) shows a laminated glazing 10 according to another embodiment of the invention. The laminated glazing 10 as shown in FIG. 3 and FIG. 4 is generally similar to that illustrated in FIG. 1 and FIG. 2 and the features that are the same are not described below in detail. The laminated glazing 10 of FIGS. 3 and 4 differs from that of FIGS. 1 and 2 in that the laminated glazing 10 of FIGS. 3 and 4, has a cut-out 71 in the film 31, the cut-out 71 generally being located at the expansion portion 61. The use of a cut-out 71 is greatly advantageous because, surprisingly, the cut-out 71 reduces hotspots around the ends of the expansion portion 61 in the first busbar 41. The cut-out 71 is a cut portion of the film 31, preferably with rounded edges, generally in the location of the expansion portion 61 and substantially co-extensive with the expansion portion 61.

In an alternative embodiment of the laminated glazing 10 of FIGS. 3 and 4 (or in the laminated glazing of FIGS. 1 and 2) the ends of the split of the first busbar 41 at the expansion portion 61 may each have an electrical connection port so that, for example, a twin cable (or e.g. a multicore cable with two ferrules) can be used to connect to, and thus supply voltage and current, to the adjacent electrical connection ports.

Figure 5:
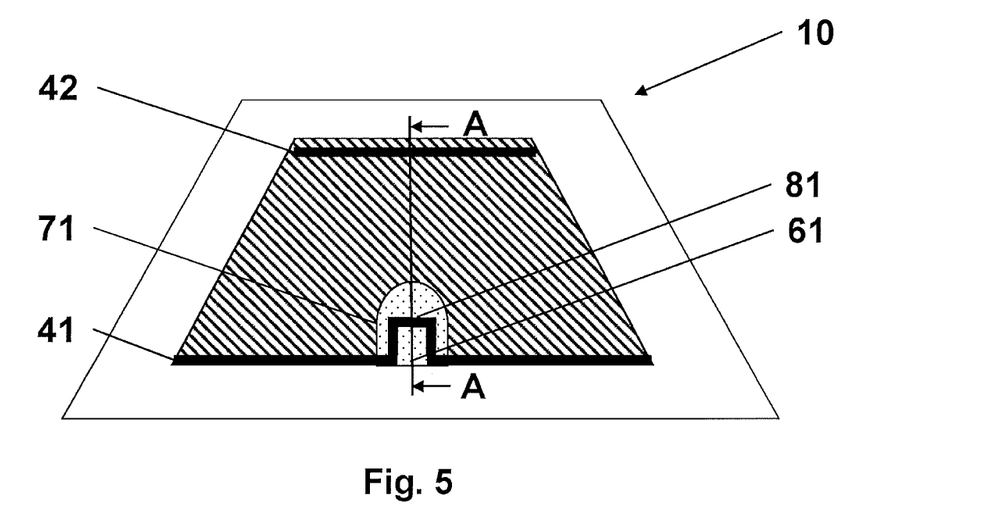
FIG. 5 is a schematic plan view of a third laminated glazing according to the invention.
Figure 6:
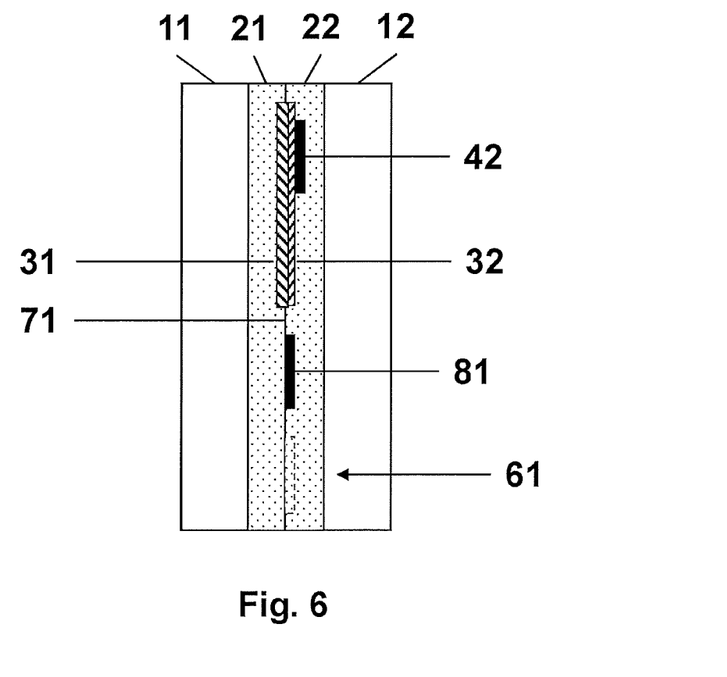
FIG. 6 is a schematic cross section on line A-A of FIG. 5.

FIG. 5 and FIG. 6 (which is a cross-sectional view on A-A of FIG. 5, through the expansion portion 61) shows a laminated glazing 10 according to a further embodiment of the invention. The laminated glazing 10 as shown in FIG. 5 and FIG. 6 is generally similar to that illustrated in FIGS. 1, 2, 3 and 4 and the features that are the same will not be described in detail. The laminated glazing 10 of FIGS. 5 and 6 differs from that of FIGS. 3 and 4 in that the expansion portion 61 of the first busbar 41 is in the form of an expansion joint, with a bridging busbar portion 81 soldered to the ends of the first, split busbar 41 on the inside (i.e. towards the centre of the laminated glazing 10) of the first busbar 41. The benefit of the bridging busbar portion 81 is that a single electrical connector can be positioned anywhere along the split busbar 41 and can supply electrical power to the whole busbar 41. The bridging busbar portion 81 is of a lower width that the first busbar 41 or second busbar 41, having a total width of about 8 mm (two parts each of 4 mm width).

Figure 7:
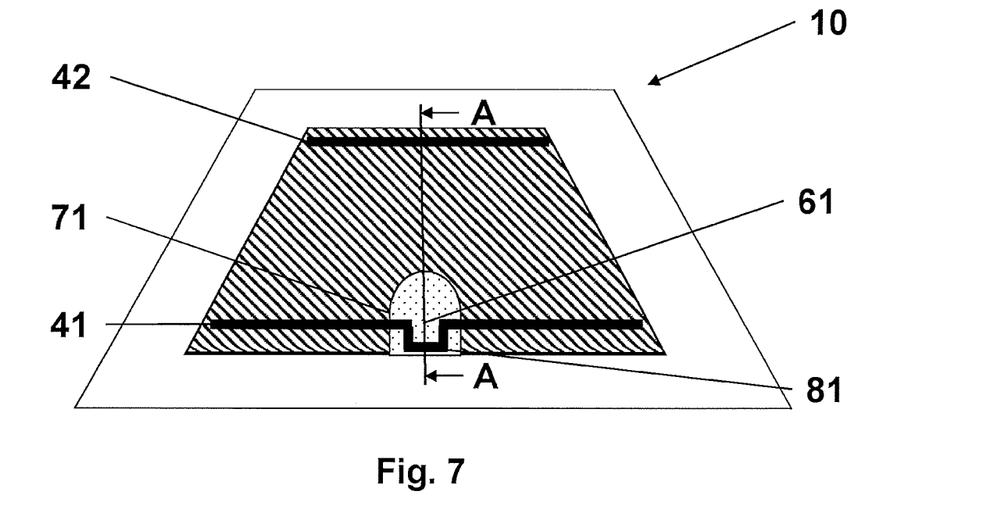
FIG. 7 is a schematic plan view of a fourth laminated glazing according to the invention.
Figure 8:
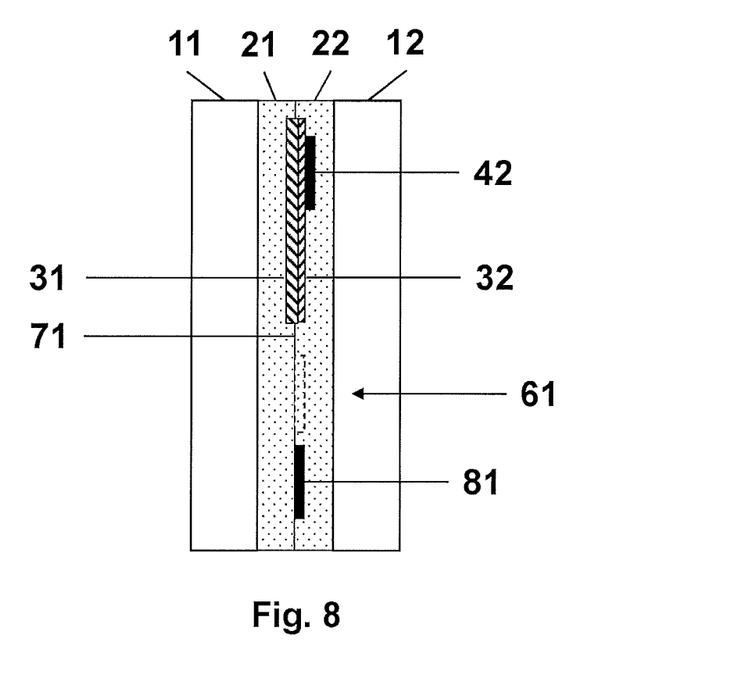
FIG. 8 is a schematic cross section on line A-A of FIG. 7.

FIG. 7 and FIG. 8 (which is a cross-sectional view on A-A of FIG. 7, through the expansion portion 61) shows a laminated glazing 10 according to a yet further embodiment of the invention. The laminated glazing 10 as shown in FIG. 7 and FIG. 8 is generally similar to that illustrated in FIGS. 5 and 6 and the features that are the same will not be described in detail. The laminated glazing 10 of FIGS. 7 and 8 differs from that of FIGS. 5 and 6 in that the expansion portion 61 is in the form of an expansion joint with the bridging busbar portion 81 outside of the first busbar 41 (i.e. towards the lower edge of the laminated glazing 10). In order to accommodate the bridging busbar portion 81, the first busbar 41 is situated inwardly (i.e. more toward the centre) of the laminated glazing 10. The arrangement of FIGS. 7 and 8 is advantageous because locating the bridging busbar portion 81 outwardly of the first busbar 41 enables the cut-out 71 of the film 31 to be smaller.

Figure 9:
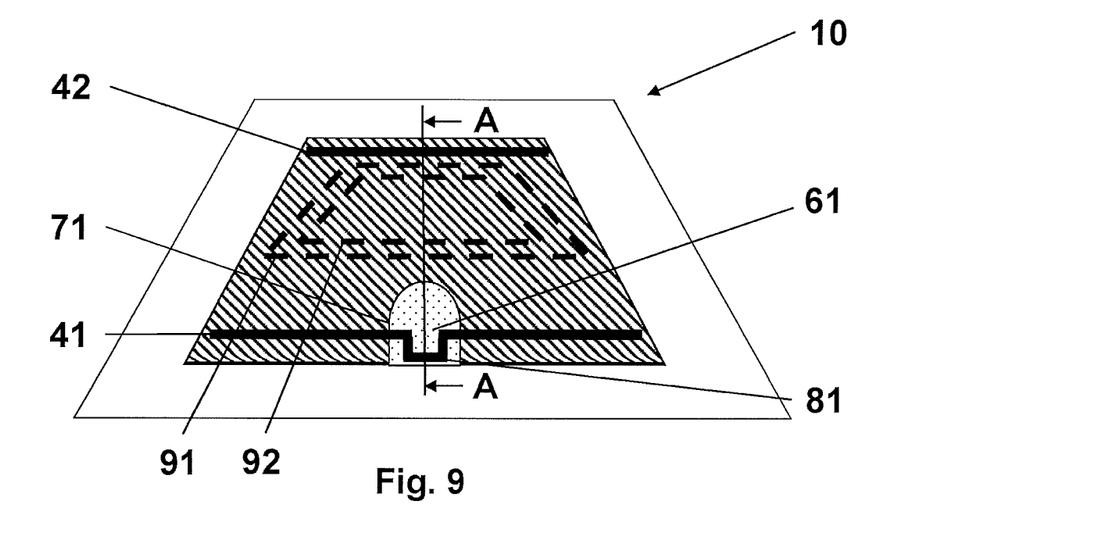
FIG. 9 is a schematic plan view of a fifth laminated glazing according to the invention.
Figure 10:
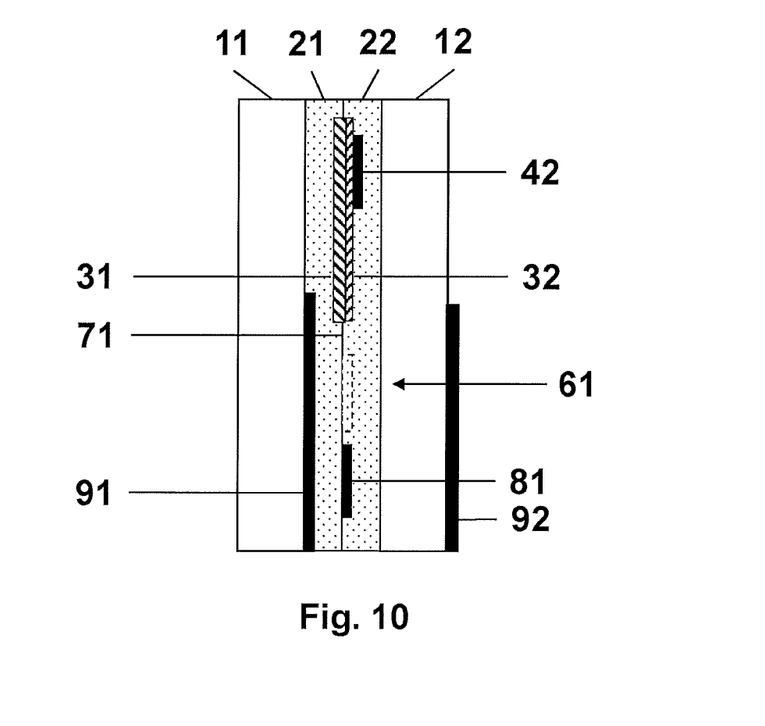
FIG. 10 is a schematic cross section on line A-A of FIG. 9.

FIG. 9 and FIG. 10 (which is a cross-sectional view on A-A of FIG. 9, through the expansion portion 61) shows a laminated glazing 10 according to a still further embodiment of the invention. The laminated glazing 10 as shown in FIG. 9 and FIG. 10 is generally similar to that illustrated in FIGS. 7 and 8 and the features that are the same will not be described in detail. The laminated glazing 10 of FIGS. 9 and 10 differs from that of FIGS. 7 and 8 in that an first obscuration band 91 is printed and fired on to the first ply of glazing material 11 before lamination and in that a second obscuration band 92 is printed and fired on to the second ply of glazing material 12 before lamination. The obscuration bands 91, 92 are advantageous in that the expansion portion 61 and cut-out 71 are thereby obscured from view when the laminated glazing is mounted and in use.

Figure 11:
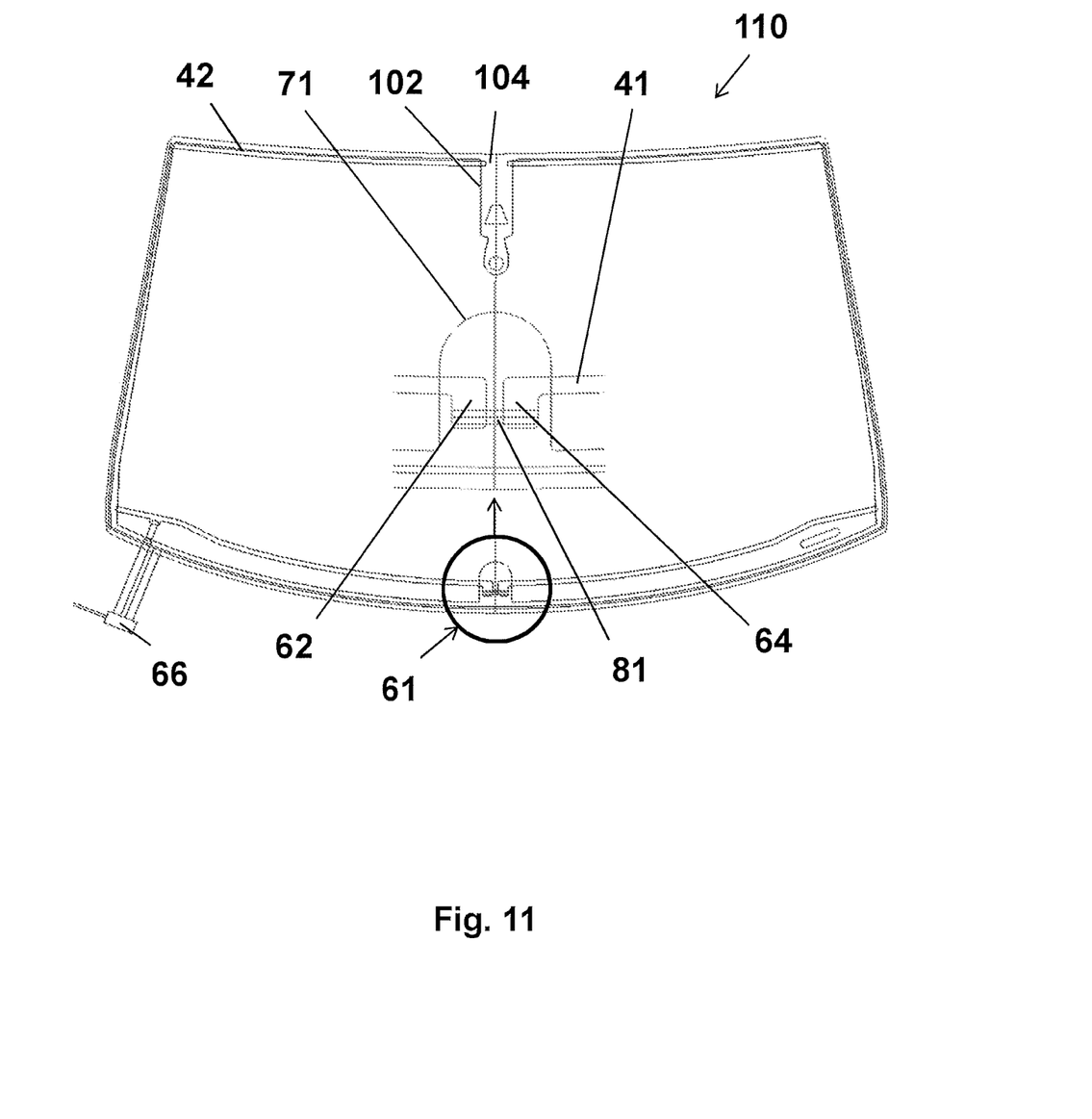
FIG. 11 is a plan view of a sixth laminated glazing according to the invention.

FIG. 11 shows a yet further embodiment of the present invention, in which a laminated glazing 110 generally of the form of a vehicle windscreen, comprises an electrically conductive portion to which electrical connection is made by a lower, first busbar 41 and an upper, second busbar 42. First busbar 41 comprises an expansion portion 61 in the form of an expansion joint toward the centre of the first busbar 41, so that first busbar 41 is in the form of a split busbar 41 with a bridging busbar portion 81 soldered to the adjacent ends of the split first busbar 41. In the expansion portion 61, the first part of the split first busbar 41 has a first tab portion 62. Similarly, the second part of the split first busbar 41 has a second tab portion 64. The first tab portion 62 and second tab portion 64 are enlarged portions at the ends of the busbar which reduce the wrinkling effect on the film 31 laminated between the first and second glazing plies and to which the bridging busbar portion 81 is soldered.

The expansion portion 61 in the first busbar 41 is located, and generally co-extensive with, a cut-out 71 in the film 31 laminated between the first and second plies of glazing material, the film 31 carrying an electrically conductive coating 32. Upper second busbar 42 also has an expansion portion 104 in the form of a gap in the second busbar 42 so that the second busbar 42 is a split second busbar 42. A cut-out portion 102 of the film 31 is generally located with, and generally co-extensive with, the second busbar expansion portion 104. The laminated glazing 110 has an electrical supply connector 66 which provides electrical power to the first busbar 41 and second busbar 42 from the vehicle electrical system (not shown).

Figure 12:
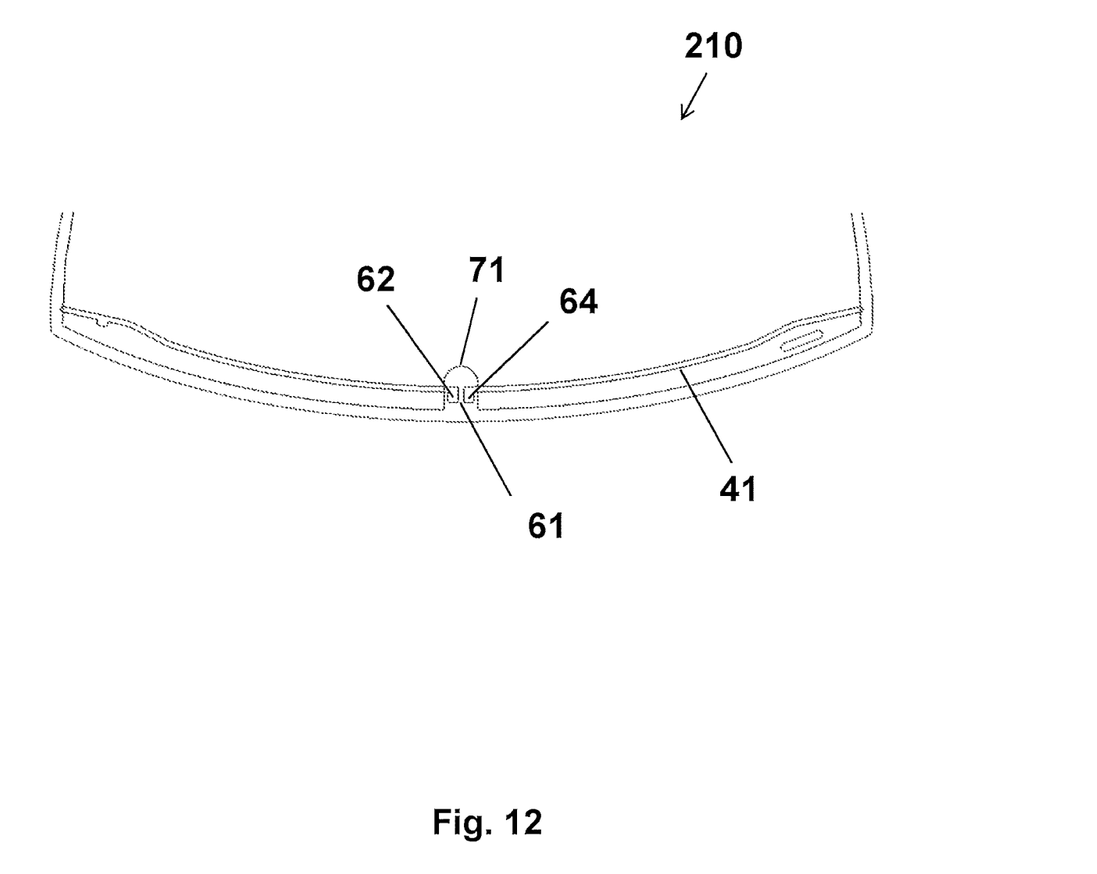
FIG. 12 is a plan view of a seventh laminated glazing according to the invention.

FIG. 12 shows the lower portion of a laminated glazing 210 of a vehicle windscreen. A first busbar 41 comprises an expansion portion 61 in the form of a gap, thus the first busbar 41 is in the form of a split first busbar 41. At the adjacent ends of the split first busbar 41 in the expansion portion 61, the first part of the split first busbar 41 has a first tab portion 62. Similarly, the second part of the split first busbar 41 has a second tab portion 64. The first tab portion 62 and second tab portion 64 are enlarged portions at the ends of the busbar which reduce the wrinkling effect on the film 31 laminated between the first and second glazing plies. The first tab portion 62 and second tab portion 64 may also each incorporate tab electrical connectors (not shown). The cut-out 71 of the film 31 is generally located at the expansion portion 61.

Figure 13:
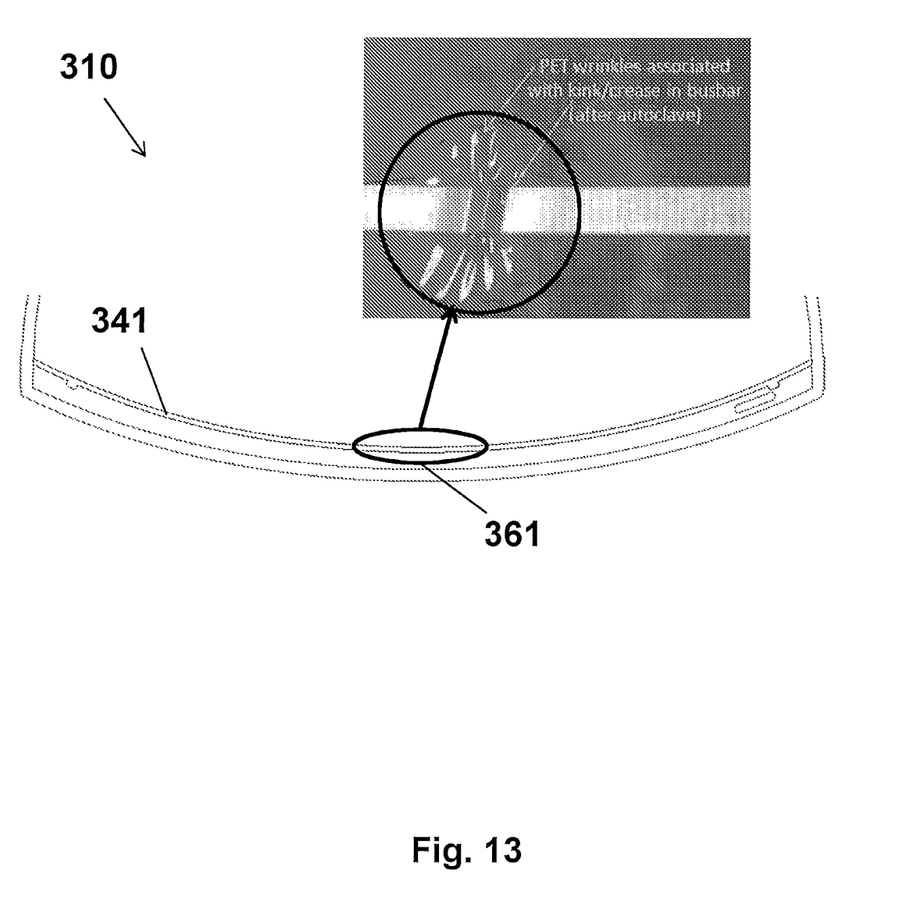
FIG. 13 is a plan view of the lower portion of a comparative laminated glazing.

FIG. 13 shows the lower portion of a comparative laminated glazing 310 having a first busbar 341. After lamination, the centre portion 361 of the first busbar 341 was photographed (inset) and as can been seen, the film laminated in the centre of the laminated glazing 310 is severely wrinkled. This can be problematic because such wrinkling can lead to cracks in the electrically conductive coating on the film which may result in cold and/or hot spots (depending on the direction and position of the wrinkles) during electrical powering of the circuit. The cold and/or hot spots may cause premature failure of the part. The laminated glazings 10, 110, 210 according to the present invention have much reduced or no such wrinkling.

Laminated glazings 10, 110, 210 may be made as described below. The comparative laminated glazing 310 was made using a similar method. Plies of the following materials are laid upon one another in order: a first ply of glass, a first polymer ply of PVB (of thickness about 0.38 mm), a film of PET of thickness about 50 µm and having an electrically conductive coating comprising silver layers, a second polymer ply of PVB (e.g. wedged acoustic PVB, suitable for sound insulation and a Head-Up-Display, i.e. HUD, having nominal thickness 0.76 mm) and a second glass ply. The first and second busbars were provided on the second polymer ply and arranged in electrical contact with the electrically conductive coating. The busbars were of a thickness about 100 µm and width about 10 mm and were pre-formed by stamping, so as to reduce wrinkling which may be caused by making busbars in-situ from a roll of metal foil. The pre-formed busbars were stamped from tinned copper foil having a layer of adhesive to make a self-adhesive strip. The self-adhesive strip had thickness about 50 µm. The pre-formed busbars were bonded to the second polymer ply using the self-adhesive strip. An expansion portion was incorporated in at least the first, lower (lower when the laminated glazing was in use) busbar. A cut-out was made in the film generally located at the expansion portion. The glass plies had pre-printed obscuration bands and the busbars and cut-out were arranged so as to be obscured by the obscuration bands.

The electrically conductive coating was a solar control sputtered coating which served as a heating element, the coating being formed of three silver layers sandwiched between layers of indium oxide of sheet resistance of about 3.2 Ω per square. The laminated glazing may require rapid defrost performance, so is may be designed to be powered at approximately 42 V DC to give a power density of approximately 900 W/m$^2$, although, as will be appreciated, the voltage and power density may vary depending on the size, design and circuit requirements of the laminated glazing for various automotive (or other) applications.

The laminated glazings may be laminated by methods involving a first step using a vacuum ring applied to the edges of the first and second plies of glazing material, wherein a vacuum is applied at approximately room temperature to de-gas the first and second polymer plies and the film. In a second step, still under vacuum, the first and second plies of glazing material are heated to a temperature in the range 80° C. to 110° C., such that the first and second polymer plies melt sufficiently to bond with the first and second plies of glass and the PET film. In a third step, the first and second glass plies and the PET film are laminated together in an autoclave in the pressure range 6 bar to 14 bar and in the temperature range 120° C. to 150° C.

REFERENCE NUMERALS

10 Laminated glazing
11 First ply of glazing material
12 Second ply of glazing material
21 First polymer ply
22 Second polymer ply
31 Film
41 First Busbar
42 Second busbar
61 Expansion portion
62 First tab
64 Second tab
66 Electrical supply connector
71 Film cut-out
81 Bridging busbar portion
91 First obscuration band
92 Second obscuration band
102 Second cut-out
104 Second busbar expansion portion
110 Laminated glazing
210 Laminated glazing
310 Laminated glazing
341 First busbar
361 Wrinkle portion

The invention claimed is:

1. A laminated glazing comprising,
a first ply of a glazing material,
a second ply of a glazing material,
a film having an electrically conductive coating, the film being located between the first ply and the second ply, wherein the film comprises polyethylene terephthalate (PET) and
a first busbar in electrical contact with the electrically conductive coating, the first busbar comprising an expansion portion, the expansion portion comprising a bridging busbar portion not in direct contact with the film or a gap in the first busbar, the first busbar being a split busbar with the gap occurring at the expansion portion,
wherein the film includes a cut-out portion located at the expansion portion, the cut-out portion comprising a portion of the PET substantially coextensive with the expansion portion that is cut-out.

2. A laminated glazing as claimed in claim 1, further comprising a first polymer ply and a second polymer ply each located between the first ply of a glazing material and the second ply of a glazing material, the first polymer ply and the second polymer ply being in contact with each respective surface of the film.

3. A laminated glazing as claimed in claim 1, wherein the first busbar comprises tab portions on each side of the expansion portion.

4. A laminated glazing as claimed in claim 3, wherein the tab portions comprise electrical connectors.

5. A laminated glazing as claimed in claim 1, wherein the expansion portion comprises an electrically conductive expansion joint.

6. A laminated glazing as claimed in claim 1, wherein the first busbar and the bridging busbar portion are formed of a strip of conductive material.

7. A laminated glazing as claimed in claim 1, wherein the bridging busbar portion has less mechanical strength than the first busbar.

8. A laminated glazing as claimed in claim 1, wherein the bridging busbar portion comprises at least one bend.

9. A laminated glazing as claimed in claim 1, wherein the expansion portion comprises a gap and the first busbar comprises tab portions on each side of the gap.

10. A laminated glazing as claimed in claim 1, wherein the first busbar is pre-formed by stamping.

11. A laminated glazing as claimed in claim 1, wherein the first busbar has a thickness in the range 50 µm to 150 µm.

12. A laminated glazing as claimed in claim 1, wherein the first busbar has a width in the range 3 mm to 15 mm.

13. A laminated glazing as claimed in claim 1, further comprising an obscuration band on the first ply and/or on the second ply of glazing material.

14. A method for manufacturing a laminated glazing, the method comprising
a) providing a first ply of a glazing material,
b) providing a second ply of a glazing material,
c) providing a film having an electrically conductive coating, the film being located between the first ply and the second ply, wherein the film comprises polyethylene terephthalate (PET),
d) providing a first busbar in electrical contact with the electrically conductive coating, and
e) laminating the glazing,
the first busbar comprising an expansion portion, the expansion portion comprising a bridging busbar portion not in direct contact with the film or a gap in the first busbar, the first busbar being a split busbar with the gap occurring at the expansion portion,
wherein the film comprises a cut-out portion located at the expansion portion, the cut-out portion comprising a portion of the PET substantially coextensive with the expansion portion that is cut-out.

15. A method as claimed in claim 14, further comprising
b1) providing a first polymer ply and a second polymer ply each located between the first ply of a glazing material and the second ply of a glazing material, the first polymer ply and the second polymer ply being in contact with each respective surface of the film.

* * * * *